United States Patent Office 3,306,753
Patented Feb. 28, 1967

3,306,753
POTASSIUM-ENRICHED CONDITIONING AGENT
FOR SALT AND PROCESS THEREFOR
Henry N. Norsen, 30 Bellevue Ave.,
Dobbs Ferry, N.Y. 10522
No Drawing. Filed Mar. 10, 1964, Ser. No. 350,697
9 Claims. (Cl. 99—143)

This invention relates to the preparation of a potassium-enriched, nutritively-balanced, conditioning agent for salt.

Pure sodium chloride, as a salt for food, is deficient in other mineral nutrients, and also has the tendency to agglomerate, especially when exposed to humid weather. It is known that the use of tricalcium phosphate, referred to as TCP or 3 $Ca_3(PO_4)_2 \cdot Ca(OH)_2$, in salt as a conditioning agent does render it free-flowing even when exposed to humid weather conditions, and although it does give it the added nutritive elements of calcium, phosphorus, hydrogen and oxygen, still such a salt is not nutritively balanced.

In addition to all these elements in the conditioning agent, there is a further requirement for potassium in order to achieve nutrition balance. The present invention provides a proper combination, by selected proportions, for producing potassium-enriched conditioning agent which, when added to salt, makes it much more tasty, beneficial and desirable.

While the addition of a one percent quantity of TCP alone to sodium chloride makes the resulting salt free-flowing so that it will not agglomerate, such a treated salt soom forms a cloudy film or coating of TCP on the inside of a glass salt shaker. On the other hand, if pure sodium chloride did not have the tendency to agglomerate, it would keep the inside of a salt shaker crystal clear. It should be noted, however, that when the subject potassium-enriched condtioning agent is combined with salt, it coats the inside of a glass salt shaker with such a thin transparent film of potassium-enriched conditioning agent as to be hardly detectable, and yet the salt so treated is free-flowing and will not agglomerate. Thus it is an object of the invention to achieve a tasty, beneficial and desirable nutritively-balanced salt which is free-flowing and obviates the objectionable cloudy film usually formed by TCP.

Having as a general objective the preparation of a potassium-enriched condtioning agent for salt that is dry and ready to mix with the salt, it is the preferred practice that the agent be prepared so that it is nutritively-balanced in itself. To achieve this balance, sodium chloride is also used in the preparation of the agent. Thus, when the potassium-enriched conditioning agent is added to salt, by proper mixing, the dispersed particles of it are presented in a nutritively-balanced condition.

It should be pointed out that it is also possible to prepare the described conditioning agent without the use of sodium chloride in the process. However, the subsequent dry mixing with salt will reliably produce the nutritive balance sought.

The invention embraces a process, as well as a formulation or composition of matter, as applied to the use of potassium chloride (KCl) and monopotassium phosphate ($KH_2PO_4$), with or without sodium chloride (NaCl), added in proper proportions to the correct amount of tricalcium phosphate, referred to as TPC or 3

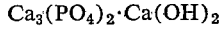

$Ca_3(PO_4)_2 \cdot Ca(OH)_2$

The mixture is dry-blended; and then, to insure homogeneousness of composition, is thoroughly wet with water to form a thin smooth paste; uniformly stirred, dried by suitable means, such as using trays for batch or a rotary kiln dryer for continuous operations, thus evaporating all the water that had been added; then the dried material is ground to the fineness of the original TCP to yield the potassium-enriched, nutritively-balanced, conditioning agent, which, when added to the salt to the extent of even less than one percent, makes the salt free-flowing so that it will not agglomerate, besides giving it the added characteristic of always keeping the inside of a glass salt shaker nearly crystal clear.

It is well known that the mineral content of foods vary widely. It is, therefore, a further object of the invention to provide a constant, dependable, and fixed source of nutritively-balanced elements in an easily and readily available form. It must be borne in mind, however, that unlike the mineral content of other foods, the desired elements are here presented in a readily assimilatory form. There is only one true nutritively-balanced formulation of the potassium-enriched conditioning agent for salt which makes available all of the desired results. While other nearly nutritively-balanced formulations can be made with these same compounds, such compositions of potassium-enriched conditioning agents for salt are not so tasty, beneficial and desirable, and it is for this reason that there is presented only certain ranges for the constituents.

Also, unlike other foods, with their inorganic-organic chemical combinations that act as excellent buffering agents, sodium chloride, as a salt, stands alone and apart without this buffering ability, and thus can be eaten only in small quantities without immediately encountering distress.

The potassium-enriched conditioning agent for salt, is especially formulated; the combination of potassium chloride and monopotassium phosphate in a molar ratio of 1 to 6 is contained in a mixture with tricalcium phosphate, as prepared by the wet method already described herein, such that the mixture exhibits a calcium to phosphorous ration of 1.15. When a combination of these three chemicals is added and thoroughly dry-blended or mixed in such a way as to become a part of sodium chloride to the extent of 0.70 percent, the resulting conditioned salt has the optimum amount of inorganic buffering ability to make it nutritively-balanced so that it is agreeable to be eaten day after day, always tasting platable and desirable.

The inclusion of the potassium-enriched condtioining agent for salt in the amount of 1.00 percent or over has been found to give a mixture richer than necessary for daily usage, and therefore, it is not recommended. Likewise, using quantities of the potassium-enriched conditioning agent for salt in the amounts of less than 0.40 percent are not rich enough to effect the desirable characteristics.

The desirable range of potassium chloride to monopotassium phosphate is expressed by a molar ratio greater than 1 to 5, but less than 1 to 7. Also, the preferred calcium to phosphorus ratio is within the range of 1.05 to 1.27.

Having now described the invention, what is claimed is:

1. A potassium-enriched conditioning agent for salt comprising a mixture of potassium chloride, monopotassium phosphate and tricalcium phosphate, wherein the mixture has a ratio of potassium chloride to monopotassium phosphate between 1:5 and 1:7 and calcium to phosphorus ratio of from 1.05 to 1.27.

2. The potassium-enriched conditioning agent for salt of claim 1, wherein a mixture has a molar ratio of potassium chloride to monopotassium phosphate of 1:6.

3. The potassium-enriched conditioning agent for salt of claim 2, wherein the mixture has a calcium to phosphorus ratio of 1.15.

4. A potassium-enriched, nutritively-balanced composition for salt comprising a major amount of sodium chloride and a minor amount of a conditioning agent consisting of a mixture of potassium chloride, monopotassium phosphate and tricalcium phosphate; wherein the mixture has a molar ratio of potassium chloride to monopotassium phosphate between 1:5 to 1:7, and a calcium to phosphorus ratio of from 1.05 to 1.27.

5. The potassium-enriched, nutritively-balanced composition for salt of claim 4, wherein the conditioning agent is between 0.40 to 1.00 percent by weight.

6. The potassium-enriched, nutritively-balanced composition for salt of claim 4, wherein the conditioning agent is 0.70 percent by weight.

7. The process for preparing a potassium-enriched conditioning agent for salt comprising the steps of: blending potassium chloride, monopotassium phosphate and tricalcium phosphate having a potassium chloride to monopotassium phosphate ratio of from 1:5 to 1:7 and a calcium to phosphorus ratio of 1.15 with water to form a paste; drying the paste to form a solid residue; and thereafter grinding the residue to substantially the particle size of the original tricalcium phosphate.

8. The process for preparing a potassium-enriched conditioning agent for salt comprising the steps of: mixing solid particles of potassium chloride and monopotassium phosphate with sodium chloride and tricalcium phosphate and adding water to form a thin, smooth paste; drying the paste to form a solid residue; and thereafter grinding the dried composition to substantially the fineness of the original tricalcium phosphate; said agent comprising a potassium chloride to monopotassium phosphate ratio of from 1:5 to 1:7 and a calcium to phosphorus ratio of 1.15 approximately.

9. The process for preparing a nutritively-balanced composition for salt, comprising the steps of: forming a conditioning agent by blending potassium chloride, monopotassium phosphate and tricalcium phosphate with water to form a paste; said combination having a potassium chloride to monopotassium phosphate ratio of from 1:5 to 1:7 and a calcium to phosphorus ratio of 1.15; drying the paste to form a solid residue and grinding the residue to substantially the particle size of the original tricalcium phosphate; thereafter combining the residue with sodium chloride to form a composition having from 0.40 to 1.00 percent by weight of conditioning agent.

References Cited by the Examiner

UNITED STATES PATENTS 1,978,040  10/1934  Lubeck _____ 99—143

FOREIGN PATENTS 11,196  5/1891  Great Britain.

OTHER REFERENCES

Moss, H. V., et al.: Tricalcium Phosphate as a Caking Inhibitor in Salt and Sugar, Industrial and Engineering Chemistry, February 1933, pages 142–147.

A. LOUIS MONACELL, *Primary Examiner.*

D. M. NAFF, *Assistant Examiner.*